March 8, 1960   J. BERGER   2,927,507
PHOTOGRAPHIC OBJECTIVE
Filed Oct. 28, 1957
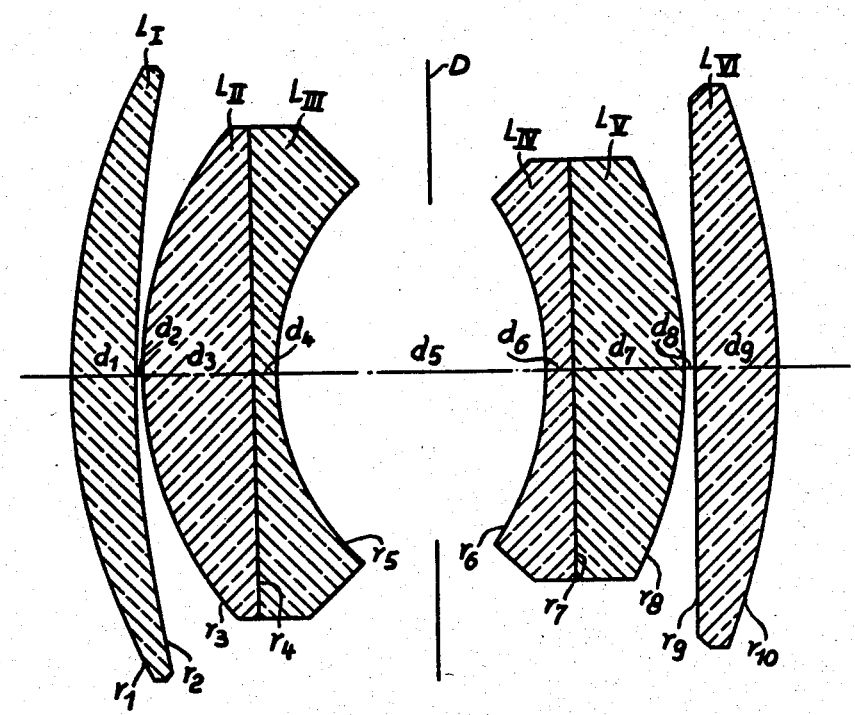

United States Patent Office 2,927,507
Patented Mar. 8, 1960

2,927,507

PHOTOGRAPHIC OBJECTIVE

Johannes Berger, Heidenheim, Germany, assignor to Carl Zeiss, Heidenheim (Brenz), Wurttemberg, Germany Application October 28, 1957, Serial No. 692,973

Claims priority, application Germany October 31, 1956

1 Claim. (Cl. 88—57)

The invention concerns photographic objectives of the Gauss type more particularly those which consist of four components separated from each other by air spaces, namely of a collective meniscus-shaped front lens, of two also meniscus-shaped dispersive components which enclose the diaphragm and turn their concave sides towards it, and of a collective rear lens wherein the dispersive components are combined of two lenses of opposing refractive powers each cemented together in such a way that the lenses standing next to the diaphragm in these components are the dispersive lenses and show a higher dispersion than the collective lenses cemented to them.

The investigations forming the basis of the invention have shown that a good compromise between the individual image aberrations can be obtained if the following conditions are all observed:

$$0.50.f < D_s < 0.60.f$$
$$1.30.\bar{r}_s < D_s < 1.50.\bar{r}_s$$
$$0.35.f < \bar{r}_s < 0.45.f$$
$$0.24.f < D_s < 0.29.f$$
$$0.86.\bar{r}_s < D_s < 1.00.\bar{r}_s$$
$$0.26.f < \bar{r}_s < 0.30.f$$
$$0.62.f < L < 0.78.f$$
$$0.10.f < d_{II} < 0.15.f$$
$$0.11.f < d_{III} < 0.16.f$$
$$1.80.\bar{r}_s < D_s < 2.20.\bar{r}_s$$
$$1.15.r_5 < |r_6| < 1.28.r_5$$
$$1.85 > n_4 > n_3 > 1.45$$
$$1.85 > n_4 > \frac{n_3 + n_5}{2} > 1.55$$

wherein $f$ = the focal length of the objective
$D_s$ = the apical separation of the surfaces 3 and 8

$$\bar{r}_s = \frac{r_3 + |r_4|}{2}$$

$D_s$ = the apical separation of the surfaces 5 and 6

$$\bar{r}_s = \frac{r_5 + |r_6|}{2}$$

$L$ = the overall length of the objective
$d_{II}$ = the axial thickness of the dispersive member standing in front of the diaphragm
$d_{III}$ = the axial thickness of the dispersive member standing behind the diaphragm
$n_3$ = the refractive index of the glass of the lens $L_{III}$
$n_4$ = the refractive index of the glass of the lens $L_{IV}$
$n_5$ = the refractive index of the glass of the lens $L_V$ It is possible thereby to obtain a comparatively long focal intercept. This feature is essential if the objective is to be used in a single-lens reflex camera. Thus for instance in an objective according to the following numerical table the focal intercept is approximately equal to $0.70 \times f$.

The numerical values correspond to a focal length $f = 1$.

The figure of the accompanying drawing shows a sectional view of an objective having values according to the following:

Table

[Focal intercept $s' = 0.70$]

| Lenses | Radii | Apical Separations | $n_d$ | $v_d$ |
|---|---|---|---|---|
| $L_I$ | $r_1 = +0.637825$ | $d_1 = 0.06561$ | 1.74400 | 44.9 |
|  | $r_2 = +1.44862$ | $d_2 = 0.00199$ |  |  |
| $L_{II}$ | $r_3 = +0.374492$ | $d_3 = 0.11134$ | 1.62041 | 60.3 |
|  | $r_4 = \infty$ | $d_4 = 0.02187$ |  |  |
| $L_{III}$ | $r_5 = +0.252100$ | $d_5 = 0.26443$ | 1.57501 | 41.3 |
| $L_{IV}$ | $r_6 = -0.310592$ | $d_6 = 0.02982$ | 1.72825 | 28.3 |
|  | $r_7 = -14.0752$ | $d_7 = 0.11531$ |  |  |
| $L_V$ | $r_8 = -0.417178$ | $d_8 = 0.00199$ | 1.74400 | 44.9 |
| $L_{VI}$ | $r_9 = +13.8740$ | $d_9 = 0.08549$ | 1.74400 | 44.9 |
|  | $r_{10} = -0.780198$ |  |  |  | wherein are designated:

With $L_I \ldots L_{VI}$, the lenses,
With $r_1 \ldots r_{10}$, the radii,
With $d_1 \ldots d_9$, the apical separations,
With $n_d$, the refractive indices, and
With $v_d$, the Abbe numbers of the glass materials for the $d$-line of the Helium spectrum.

An objective constructed according to the above table with a focal length of $f \approx 50$ mm. has therefore a focal intercept of about 35 mm.; for a reflex camera of film size $24 \times 36$ mm.[2] this corresponds almost exactly to the desired value. The numerical values of the table have furthermore been adjusted in such a way that the aforesaid objective with a focal length of 50 mm. can be fitted into a commercially available shutter of the size 00.

I claim:

A photographic objective consisting of four components separated from each other by air spaces and more particularly of a collective meniscus-shaped front lens, of two also meniscus-shaped dispersive components which enclose the diaphragm and turn their concave sides towards it and of a collective rear lens wherein the dispersive components are combined from two lenses of opposing refractive powers each in such a way that the lenses standing next to the diaphragm in these components are the dispersive lenses and show a higher dispersion than the collective lenses cemented to them characterized by the combination of the following characteristics:

$$0.50f < D_s < 0.60f$$
$$1.30\bar{r}_s < D_s < 1.50\bar{r}_s$$
$$0.35f < \bar{r}_s < 0.45f$$
$$0.24f < D_s < 0.29f$$
$$0.86r_s < D_s < 1.00\bar{r}_s$$
$$0.26f < \bar{r}_s < 0.30f$$
$$0.62f < L < 0.78f$$
$$0.10f < d_{II} < 0.15f$$
$$0.11f < d_{III} < 0.16f$$
$$1.80\bar{r}_s < D_s < 2.20\bar{r}_s$$
$$1.15r_5 < |r_6| < 1.28r_5$$
$$1.85 > n_4 > n_3 > 1.45$$
$$1.85 > n_4 > \frac{n_3 + n_5}{2} > 1.55$$

wherein
$f$ = the focal length of the objective
$D_a$ = the apical separation of the surfaces 3 and 6

$$f_a = \frac{r_3 + r_6}{2}$$

$D_s$ = the apical separation of the surfaces 5 and 6
$L$ = the overall length of the objective
$d_{II}$ = the axial thickness of the dispersive member standing in front of the diaphragm
$d_{III}$ = the axial thickness of the dispersive member standing behind the diaphragm
$n_3$; $n_4$; $n_5$ = the refractive indices of the glasses of the lenses $L_{III}$; $L_{IV}$; $L_V$ respectively for the $d$-line of the helium spectrum, and further characterized in that the individual surface refractive powers ($\Delta n/r$) differ by a maximum of $\pm 0.185/f$ each and the apical separations ($d$) by a maximum of $\pm 0.020 \cdot f$ each from the values taken from the following numerical example:

$L_I \ldots L_{VI}$ being the lenses,
$r_1 \ldots r_{10}$ being the radii,
$d_1 \ldots d_9$ being the apical separations,
$n_d$ being the refractive indices,
$\nu_d$ being the Abbe numbers of the glass materials for the $d$-line of the helium spectrum, and
$\Delta n/r$ being the power of refraction of the single lens surfaces.

References Cited in the file of this patent
UNITED STATES PATENTS

| | | |
|---|---|---|
| 2,532,751 | Baker | Dec. 5, 1950 |
| 2,777,362 | Berger et al. | Jan. 15, 1957 |
| 2,784,643 | Brendel et al. | Mar. 12, 1957 |
| 2,784,646 | Brendel et al. | Mar. 12, 1957 |
| 2,831,397 | Berger et al. | Apr. 22, 1958 |

| Lenses | Radii | Apical Separations | $n_d$ | $\nu_d$ | $\Delta n/r$ |
|---|---|---|---|---|---|
| $L_I$ | $r_1 = +0.637825 \cdot f$ | $d_1 = 0.06561 \cdot f$ | 1.74400 | 44.9 | $+1.166464/f$ |
|  | $r_2 = +1.44362 \cdot f$ | $d_2 = 0.00199 \cdot f$ |  |  | $-0.513592/f$ |
| $L_{II}$ | $r_3 = +0.374492 \cdot f$ | $d_3 = 0.11134 \cdot f$ | 1.62041 | 60.3 | $+1.656671/f$ |
|  | $r_4 = \infty$ | $d_4 = 0.02187 \cdot f$ |  |  | 0.000000 |
| $L_{III}$ | $r_5 = +0.252100 \cdot f$ | $d_5 = 0.26443 \cdot f$ | 1.57501 | 41.3 | $-2.280881/f$ |
| $L_{IV}$ | $r_6 = -0.310592 \cdot f$ | $d_6 = 0.02982 \cdot f$ | 1.72825 | 28.3 | $-2.344716/f$ |
|  | $r_7 = -14.0752 \cdot f$ | $d_7 = 0.11531 \cdot f$ |  |  | $-0.001119/f$ |
| $L_V$ | $r_8 = -0.417178 \cdot f$ | $d_8 = 0.00199 \cdot f$ | 1.74400 | 44.9 | $+1.783411/f$ |
| $L_{VI}$ | $r_9 = +13.8740 \cdot f$ | $d_9 = 0.08549 \cdot f$ | 1.74400 | 44.9 | $+0.053625/f$ |
|  | $r_{10} = -0.780198 \cdot f$ |  |  |  | $+0.953604/f$ |